INVENTORS
GAYLORD W. BROWN
DONALD J. RISE
BY ROBERT T. JOHNSON

ATTORNEYS

INVENTORS
GAYLORD W. BROWN
DONALD J. RISE
BY ROBERT T. JOHNSON

ATTORNEYS

FIG. 6

INVENTORS
GAYLORD W. BROWN
DONALD J. RISE
ROBERT T. JOHNSON

INVENTORS
GAYLORD W. BROWN
DONALD J. RISE
BY ROBERT T. JOHNSON
ATTORNEYS

FIG. 11

United States Patent Office 3,297,504
Patented Jan. 10, 1967

3,297,504
METHOD AND APPARATUS FOR ASSEMBLING AND JOINING THERMOPLASTIC CONTAINER SECTIONS BY FRICTION WELDING
Gaylord W. Brown, Donald J. Rise, and Robert T. Johnson, Beaverton, Mich., assignors to Brown Machine Company of Michigan, Inc., a corporation of Michigan
Filed Mar. 13, 1963, Ser. No. 264,809
23 Claims. (Cl. 156—73)

This invention relates to the manufacture of containers of varied design, including containers formed of organic thermo-plastic materials, and more particularly to thin-walled containers suitable to carry a wide variety of products, including liquid and pulverulent detergents, which can be made so inexpensively that they can be discarded when empty. Presently, containers of this type are conventionally blow molded, although some work has been done along the lines of differential pressure forming separate sections of such containers and joining them with an adhesive or by heat sealing lateral flanges formed thereon.

We have determined that it is much less expensive to mass produce sectionally formed parts of containers, which can be efficiently and reliably joined together, than to blow mold the same containers in one piece. Further, we have found that suitable container sections can be assembled and sealed together in a rapid and continuous manner by a controlled friction welding process and that the machinery or equipment for producing containers in this manner is considerably less costly and more practical to operate and maintain than is comparable blow molding equipment. Briefly, the invention is concerned with the concept of making containers from plastic sheets that includes applying differential pressures to a first moldable sheet to form integral closed bottom container sections therein, applying differential pressures to a second moldable sheet to form integral upper container sections therein, severing the sections from those sheets and forming openings in the tops of the upper sections, traveling the bottom and top sections to an assembly area, and joining the open ends of the sections formed by their severance from the sheets in a circular seam. Another concept advanced is the preferred joinder of parts by what we term "inertia friction welding." The concept is employed, for example, to weld the overlying open ends of the container sections by applying driving forces to bring one of the sections to a predetermined speed of rotation relative to the other section, thence releasing the driving forces, and finally immediately bringing adjoining ends of the sections into snugly interfitting, lapped relation to weld the lapped ends with a controlled, friction generated heat. Because it is not possible to differential pressure form such sections to exact tolerances the diameters of the parts manufactured are selected so that the sections will always have an interference fit wherein the receiving portion of the one container section will always be slightly less in diameter than the entrant portion of the mating container section. In friction welding the parts together according to the present invention, the same controlled inertia energy is imparted to make the weld in each instance, regardless of the variance of the fit.

One of the prime objects of the invention is to provide continuous processing machinery for continuously and reliably forming containers in the indicated manner at a high rate of speed corresponding to the speed of operation of machinery for labeling, filling, and capping the containers so that the latter machinery can operate at full speed in a continuous processing line.

Another object of the invention is to provide machinery of the character described which is eminently suitable for the production of a large variety of containers of diverse shape and size, including bottles for holding liquids wherein the bottles have threaded necks on which caps may be screwed or necks on which caps may be snapped.

A further object of the invention is to provide continuously operating equipment for furnishing the tops and bottoms in inverted position, and for receiving the tops and bottoms and accurately vertically positioning them, so that they may be joined together with the precision required in an economical and reliable manner.

Another object of the invention is to provide continuously traveling, multiple station elements for, not only receiving and guiding the interference fitting container tops and bottoms, but also revolving one relatively to the other and thence moving the end edges of the tops and bottoms into interfering fitting relation to friction weld them together in a manner which takes into consideration the fact that the character of the interference fit will vary in each instance because the container sections cannot be differential pressure formed to exact tolerances. This problem is solved by bringing the parts to a constant predetermined relative speed and disconnecting the parts from the part driving mechanism immediately prior to forcing them into interfitting relation.

A further object of the invention is to provide machinery of the character described which is adaptable to position and weld interference fitting container sections of various shapes and sizes with only a simple adjustment of the speed of rotation imparted to the one container section in each instance.

Still a further object of the invention is to provide machinery of the character described which will operate continuously over long periods of time without the need of interruption for repair or adjustment, so that the container forming, labeling, filling, and capping line may operate continuously and rapidly without shutdown.

Other objects and advantages of the invention will be pointed out specifically or will become apparent from the following description when it is considered in conjunction with the appended claims and the accompanying drawings, in which:

Figure 1:
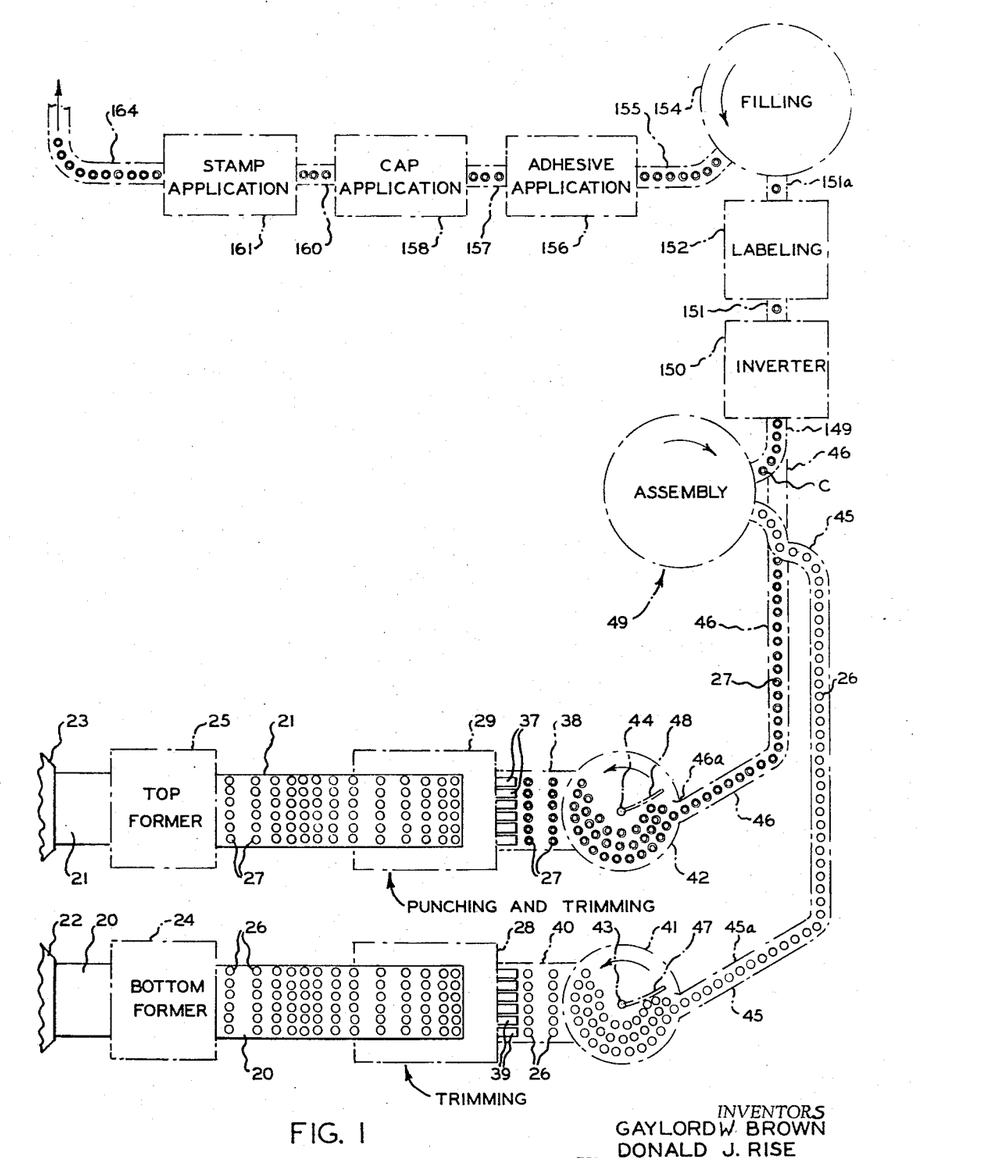
FIGURE 1 is a plan view schematically illustrating the processing line.

Referring now more particularly to the accompanying drawings, in which preferred embodiments of the invention only have been disclosed, FIGURE 1 shows thermoplastic sheets 20 and 21 proceeding from molding heads 22 and 23 which are of conventional construction and are adapted to continuously extrude the webs or sheets 20 and 21 from a plastic material which provides the desired molding characteristics and is of the thickness and width required for the capacity of the forming machines 24 and 25 which differential pressure form the container bottom sections 26 and top sections 27 in the sheets 20 and 21. Alternatively, the sheets 20 and 21 could be supplied from rolls of the plastic sheet material and heated to the desired degree of softness in machines 24 and 25 which may be of the type illustrated in the book "Fundamentals of Sheet Forming," published in 1960 by The Dow Chemical Company and referred to therein as the Brown Machine Co. continuous forming machine.

Figure 2:
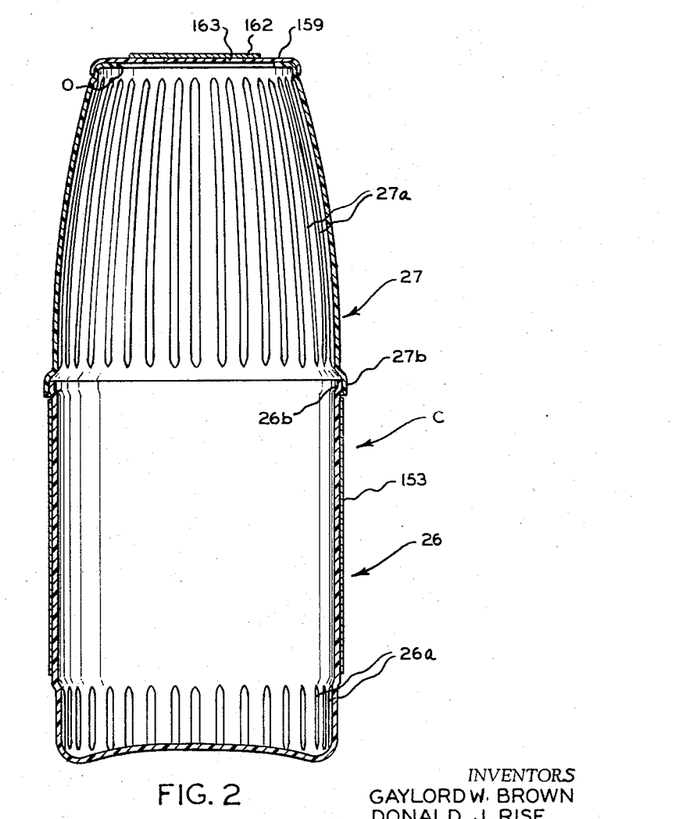
FIGURE 2 is a schematic, side elevational view of one of the completed product-filled containers.
Figure 3:
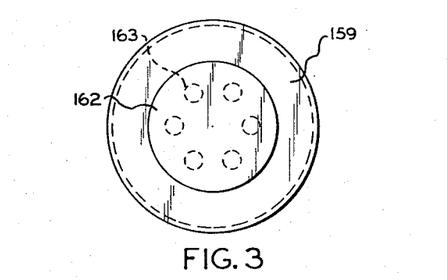
FIGURE 3 is a top plan view thereof.

The preferred plastic material is high impact polystyrene plastic of a composition suitable for extruding in web form, but other suitable plastics may be used, such as polyethylene and polyvinylchloride. In FIGURES 2 and 3 we have shown the container C which is formed when a bottom section 26 and slightly tapering top section 27 are joined. It is to be understood that the particular container shown is depicted only as a matter of example and the invention also contemplates the formation of containers of widely varying shape and size.

*The trimming machines*

From the vacuum forming machines 24 and 25 the sheets 20 and 21 are shown proceeding to a trimming machine 28 and a punching and trimming machine 29, respectively, of the design manufactured by Brown Machine Company of Beaverton, Michigan. A punching and trimming machine is illustrated schematically in FIGURE 4 and, as shown, includes a platen 30 movable horizontally toward and away from the vertically moving plastic web 21, as indicated. The web 21, as it proceeds from the forming machine 25, is looped upwardly in the usual manner and then extends vertically down through the punching and trimming machine 29. The continuously operating platen 30 is driven from a motor driven drive shaft 31 through a crank arm 32 and connecting rod or arm 33.

Mounted on the platen 30 are a row of punches 34 having parts 34a sized to punch the openings O (FIGURES 2 and 8) in the end walls of the cup-like sections 27 which are drawn intermittently downwardly a row or increment at a time to dispose successive cups 27 opposite the punches 34. Also mounted on the platen 30 are a row of open ended, ring, die members 35 having cutting edges 35a which sever the sections 27 from the web 21, the dies 35 being hollow to receive the cup-like sections 27, as shown, and there being an air nozzle 36 for each die 35 for blowing the severed section 27 into an inverter tube 37 (see FIGURES 1 and 4). Each tube 37 includes a downwardly inclined spout portion 37a leading from a closed rear portion 37b to the endless conveyor belt 38 which leads away from the punching and trimming machine 29. The portion 37b of each tube 37 is of less length than the axial length of a container section 27 so that when air pressure blows a container section 27 into engagement with the end wall of the section 37b it can then fall by gravity through the spout 37a to an inverted position with its larger end disposed upwardly. The air blown through nozzles 36 which are connected to a suitable source of air under pressure can be interrupted intermittently by conventional valving to permit this to occur.

Figure 4:
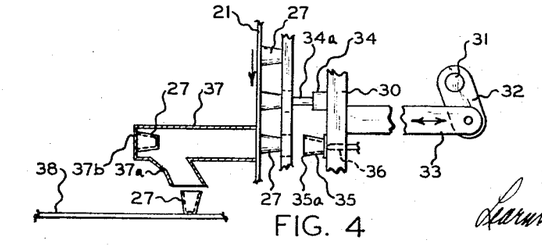
FIGURE 4 is a partly sectional, somewhat schematic, fragmentary side elevational view illustrating a punching and trimming machine which may be employed for the container top sections.
Figures 5, 7:
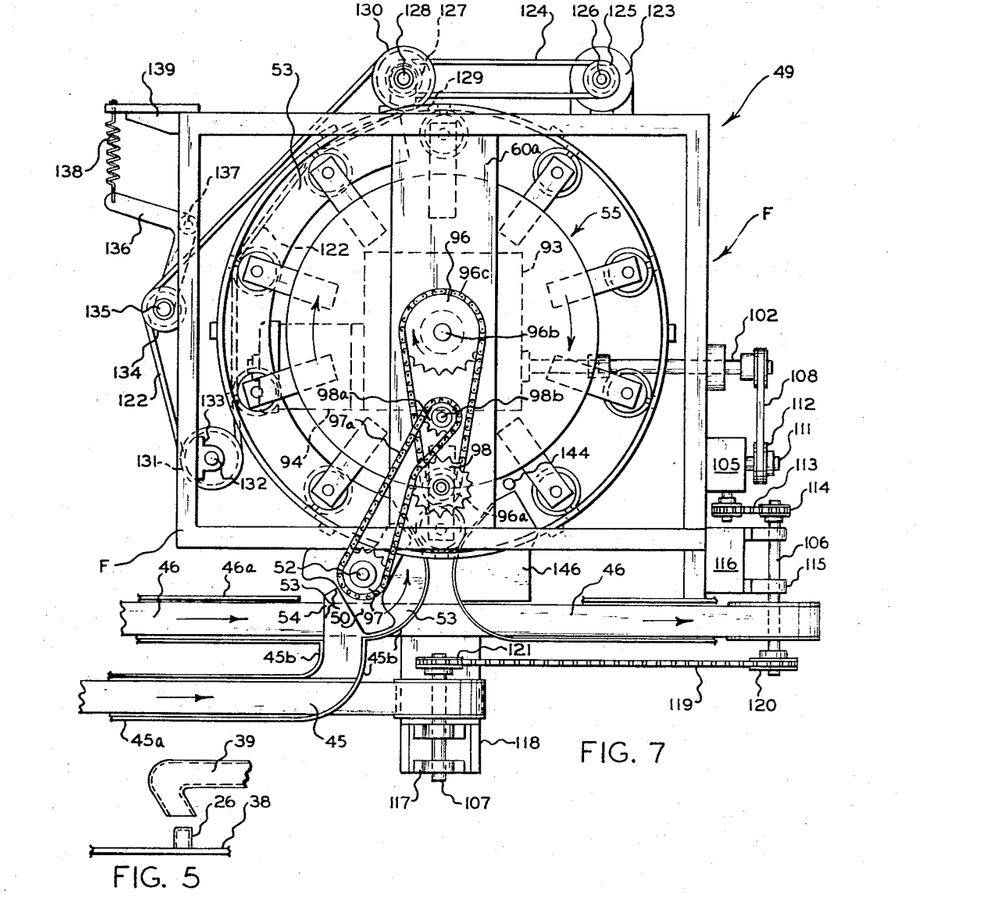
FIGURE 5 is a similar view illustrating the discharge end of a trimming machine which may be used to trim the container bottom sections.
FIGURE 7 is a top plan view thereof with the container parts omitted in the interests of clarity.
Figures 8, 9, 10:
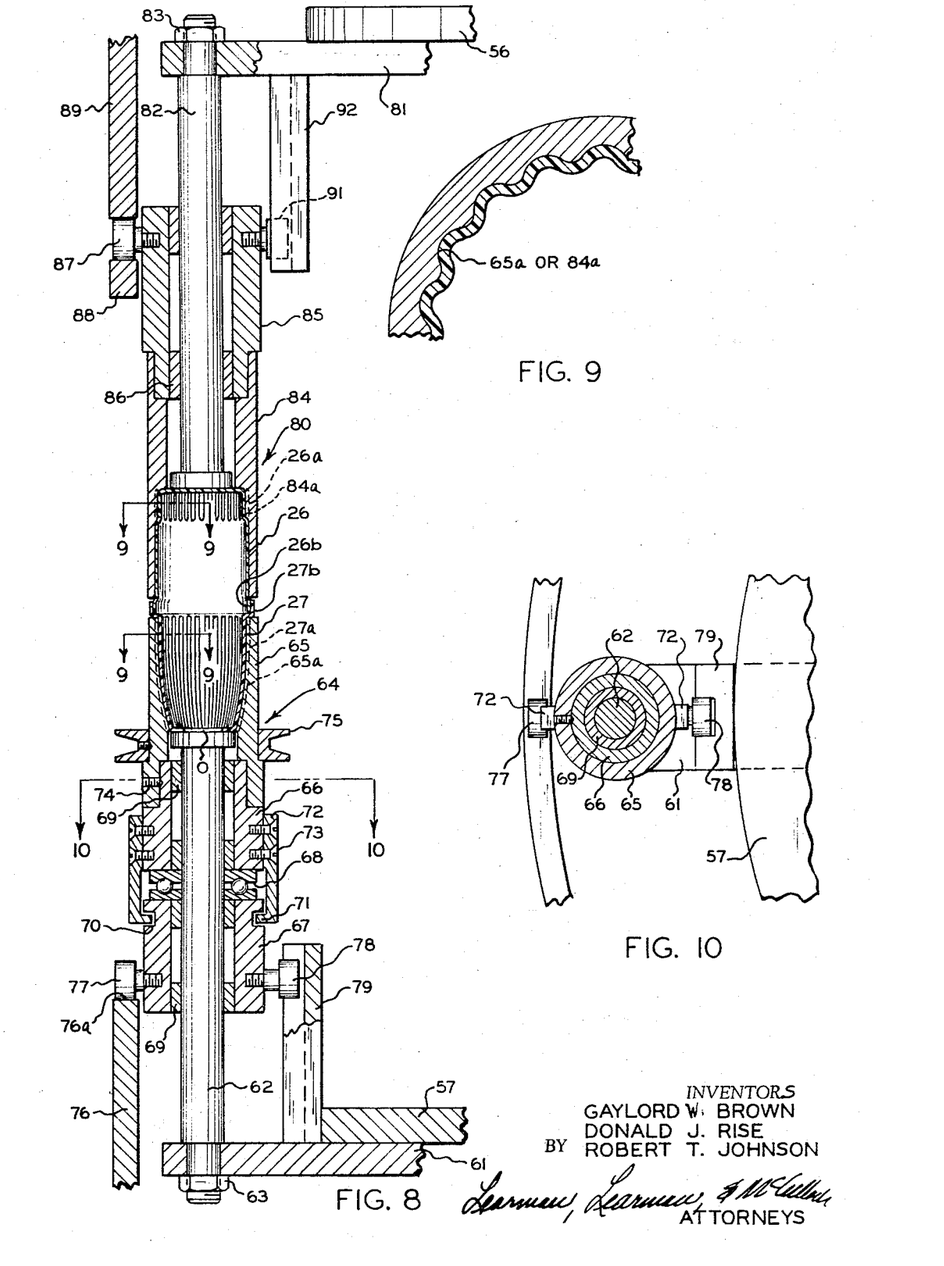
FIGURE 8 is a partly sectional, fragmentary, enlarged elevational view of one of the guide assemblies for joining the separately formed top and bottom sections of a container.
FIGURE 9 is an enlarged, sectional plan view taken on either of the lines 9—9 of FIGURE 8.
FIGURE 10 is a sectional plan view taken on the line 10—10 of FIGURE 4.

The trimming machine 28 is of the same construction except that no punch 34 is necessary since the bottom sections 26 are to have closed ends. The tubes 37 are also replaced by tubes 39, as shown in FIGURE 5, which deliver the bottom sections or cups 26 from the trimming machine 28, as shown in FIGURE 1. The air under pressure blown through tubes 39 from similar nozzles 36 may be blown continuously and deposits the bottom sections 26 in turned over position, as shown in FIGURE 5. As indicated in FIGURE 8, the sections 26 and 27 are later joined with the tops and bottoms in the position in which they are shown in FIGURES 4 and 5 so that the container C is formed in an upside down position.

Figure 6:
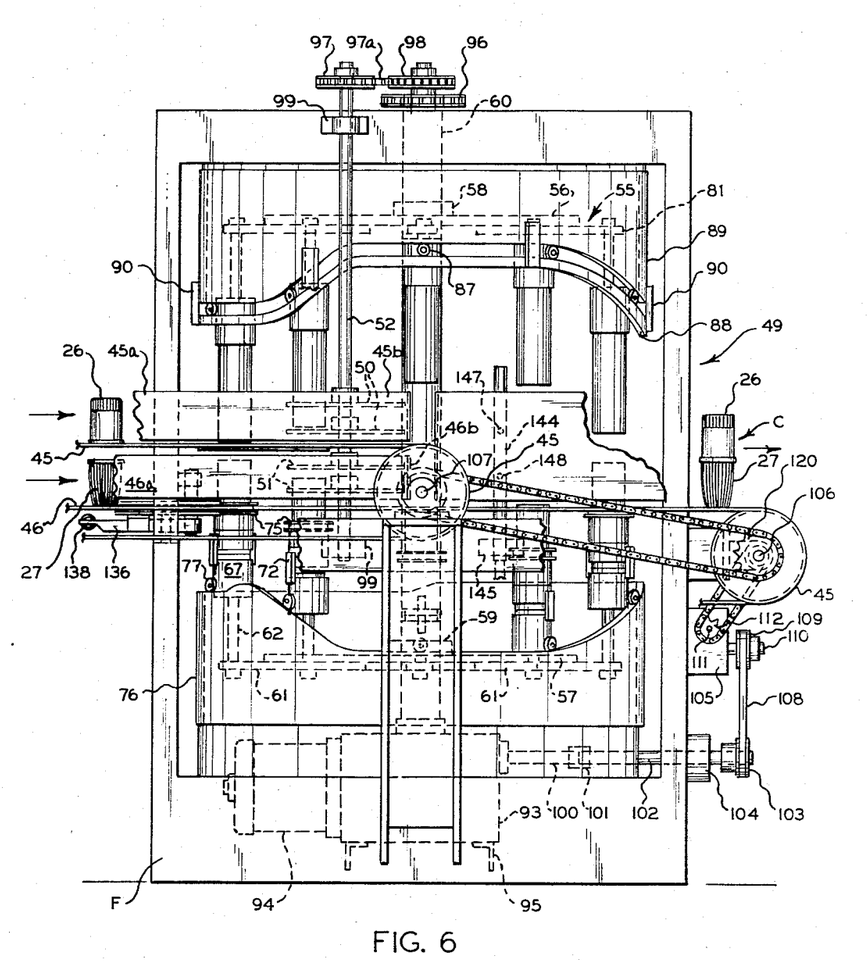
FIGURE 6 is a front elevational view of the assembly machine with separate container parts illustrated on the incoming portions of the conveyors at the left end of the view and an assembled container leaving on the discharge portion of one of the conveyors at the right end of the view.

From the conveyors 38 and 40 the sections 26 and 27 proceed respectively to rotary accumulator tables 41 and 42 which rotate on shafts 43 and 44 and deliver the sections 26 and 27 to conveyor lines 45 and 46, respectively. The conveyors 45 and 46 are made up of endless belt conveyors placed in end-to-end relation and include side guide rails 45a and 46a which assist in removing the sections 26 and 27 to the conveyors 45 and 46, respectively. Fixed flexible guide bands 47 and 48 assist in directing the containers to the conveyors 45 and 46, which deliver the container sections 26 and 27 to the assembly machine generally designated 49, belt conveyor 45 being elevated with respect to the position of belt conveyor 46, as shown in FIGURE 6. As shown in FIGURES 6 and 7, the conveyors 45 and 46 lead to vertically spaced pairs of star wheels 50 and 51 mounted on a shaft 52 opposite conveyors 45 and 46, respectively, to transfer the container sections 26 to the assembly machine. As shown in FIGURE 7, the guide rails 45a have curvilinear portions 45b and a floor portion or shelf 53 to support container sections 26 is provided leading from the conveyor belt 45, as shown, and extending around under the star wheels 50 and thence arcuately through substantially 180°. A curvilinear portion 46b is similarly provided for the guide rail 46a, along with a floor or shelf portion 54 which supports the container sections 27 as they are transferred by the star wheels 51.

*The assembly machine*

The star wheels 50 and 51 deliver the container sections 26 and 27 to a carrier assembly generally designated 55 which is mounted for clockwise rotation (FIGURE 7) by a rectilinear framework or frame F and includes an upper disk or plate 56 and a lower disk or plate 57 (see FIGURE 6) supported from collars 58 and 59 mounted on a central shaft 60 for revolving the carrier 55. Bearing platforms 60a span the framework F to journal shaft 60.

Mounted by the lower support plate 57 are radially extending support bars 61 for pedestal posts 62 (see FIGURE 8) which can be secured in position by nuts 63 as shown. A lower guide tube assembly generally designated 64 surrounds each pedestal post 62 and comprises a sleeve 65 shaped to receive one of the container sections 27. Each sleeve 65 is supported for vertical sliding movement relative to pedestal post 62 by a pair of slide bearings 66 and 67 between which is sandwiched a roller bearing 68. The bearings 66 and 67 include post engaging bushings 69, and an annular groove 70 is provided in each slide bearing 67 for accommodating the flange 71 of a connecting plate 72 which can be secured to the superjacent slide bearing 66 with screws 73. Screws 74 or the like may be employed to secure each sleeve 65 to the upper slide bearing 66, and fixed on each sleeve 65 is a belt accommodating pulley 75 by means of which the sleeve 65 and slide bearing 66 may be rotated relative to the slide bearing 67.

As the rotary carrier 55 moves slowly in its circular path, the vertical position of the guide tube assembly 64 is determined by a stationary circular cam track 76 fixed to frame F having an upper cam surface 76a on which a follower roller 77 mounted by the lower slide bearing 67 rides. Also mounted on each slide bearing 67 is a guide roller 78 accommodated within a channel member 79 mounted by the carrier lower plate 57 to guide each assembly 64 in its vertical travel.

Directly above each lower guide tube assembly 64, the upper carrier plate 56 mounts an upper guide tube assembly generally designated 80 on radially extending support bars 81. Each support bar 81 mounts a pedestal post 82 which can be secured in position by a nut 83 and which is surrounded by a container section 26 accommodating sleeve 84 which fixes to a slide bearing 85 mounting the sleeve 84 for vertical movement on post 82. Each bearing 85 includes post engaging bushings 86 and also mounts a follower roller 87 which rides on a circular cam 88 which is connected to the stationary annular portion 89 of the frame by bars 90. Similarly provided on each slide bearing 85 is a guide roller 91 which is guided in its vertical travel by a channel stabilizer member 92 mounted by each support bar 81.

The shaft 60 and associated parts are driven from a speed reducer 93 connected with an electric motor 94, the speed reducer shown being mounted on angle supports 95 (see FIGURE 6). Mounted on drive shaft 60 is a sprocket 96 mounted on a stub shaft 96b which connects to a sprocket 96a, there being a chain 96c trained around sprockets 96 and 96a. Sprocket 97 mounted on the star wheel shaft 52 is driven by a chain 97a trained around a sprocket 98 on shaft 96b, the chain 97a also being trained around an idler sprocket 98a mounted on a stub shaft 98b. The star wheel shaft 52 is supported from bearings 99 mounted by the frame F, as shown, and it is in this manner that the infeed star wheels 50 and 51 are driven.

Another output shaft 100 for speed reducer 93 is coupled as at 101 to a shaft 102 and drives a pulley 103 which is mounted on the end of shaft 102, a bearing 104 being provided on the end wall of the frame F to support the shaft 102. The pulley 103, through the medium of a gear box 105, drives a shaft 106 which powers endless belt conveyor 46, and a shaft 107 which powers endless belt conveyor 45, the gear box 105 being connected with pulley 103 through the medium of a belt 108 trained around a pulley 109 mounted on the gear box input shaft 110. The gear box output shaft 111 mounts a sprocket 112 around which is trained a chain 113 connecting with a sprocket 114 (FIGURE 7) on shaft 106, bearings 115 for supporting shaft 106 being mounted by a block 116 from the frame F. The drive is transmitted from shaft 106 to shaft 107, which is supported by bearings 117 mounted on the support platform 118, by a chain 119 trained around a sprocket 120 on shaft 106 and a sprocket 121 on shaft 107.

As apparent from an inspection of FIGURES 2 and 8, the container sections 27 are ribbed or corrugated as at 27a and the interior of sleeve 65 is likewise ribbed or corrugated as at 65a so that once the container sections 27 are seated within sleeve 65 they are prevented from rotating relative to sleeve 65. Similarly, the container sections 26 include ribbed or corrugated portions 26a and the interior of the sleeve 84 of each upper guide tube assembly is similarly corrugated as at 84a to receive a container section 26, so that rotation of the container section 26 in the sleeve 84 is precluded. It will further be noted that the sections 27 have laterally and thence vertically or axially extending lip or flange portions 27b for receiving the terminal ends 26b of the container sections 26. It is to be understood that there is an interference fit between the lip sections 26b and 27b so that once they are assembled in interfitting, overlapping relation, as in FIGURE 8, the rotation of one relative to the other will produce a friction which generates heat. Generally speaking, the exterior diameter of the terminal lip or edge portion 26b will be .002 to .010 inch larger than the interior diameter of the lip portion 27b which receives it. This variance will not be constant, of course, since it is impossible to form these containers to exact tolerances in mass production differential pressure forming operations. It is for this reason that the rotatably driven bottom holder or sleeve portions 65 are brought up to speed before the sections 26 and 27 are brought into interfitting relation, and the drive released prior to the time the container sections are brought into interfitting relation. This is mechanicaly much simpler than using difficulty adjustable breakaway clutches or the like, particularly where traveling station machines are employed. With the mass or weight of sleeve 65 remaining the same in each instance and the drive imparted to pulley 75 bringing the sleeve 65 to a predetermined speed of rotation in each instance, the same rotary energy is imparted to the container section 27 in each instance, regardless of the relative tightness of the fit. With the same level of energy being imparted in each instance, the spin weld achieved will be uniform, even though the interference fit differential may be .002 in one instance and .008, for example, in another instance, and a uniformly strong weld can be achieved every time. Whereas in one instance the freely spinning container section 27 may be halted in its relative rotation with the stationary container 26 within a few revolutions after the two parts are interfitted, the next container section 27 may spin through several additional revolutions relative to its mating section 26 prior to the time the weld is achieved and relative rotation ceases. In each instance, however, the same energy is imparted and the same controlled liquid-tight weld is achieved.

A belt for driving the pulleys 75 when they reach a certain stage (see FIGURE 3) in the rotation of carrier 55 from the location of entry of the sections 26 and 27 opposite star wheels 50 and 51 is shown at 122 in FIGURE 7. A motor 123 mounted on the frame F drives the belt 122 through the medium of a belt 124 trained around a pulley 125 on the armature shaft 126 of motor 123, the belt 124 being trained around a pulley 127 mounted on a shaft 128 journaled by a bearing 129 also mounted on the frame F. Mounted by the stub shaft 128 is a pulley 130 around which belt 122 is trained, and it will be seen that at its opposite end belt 122 is trained around a pulley 131 mounted on a shaft 132 supported by a bearing 133 from the frame F. Belt 122 is maintained taut by an idler pulley 134 mounted on a shaft 135 on a bell crank lever 136 which is pivoted to the frame F as at 137, there being a spring 138 connected with the opposite end of bell crank lever 136 which creates a tension tending to pull belt 122 outwardly as shown. Spring 138 is connected with a bracket 139 which is fixed to frame F.

Figure 11:
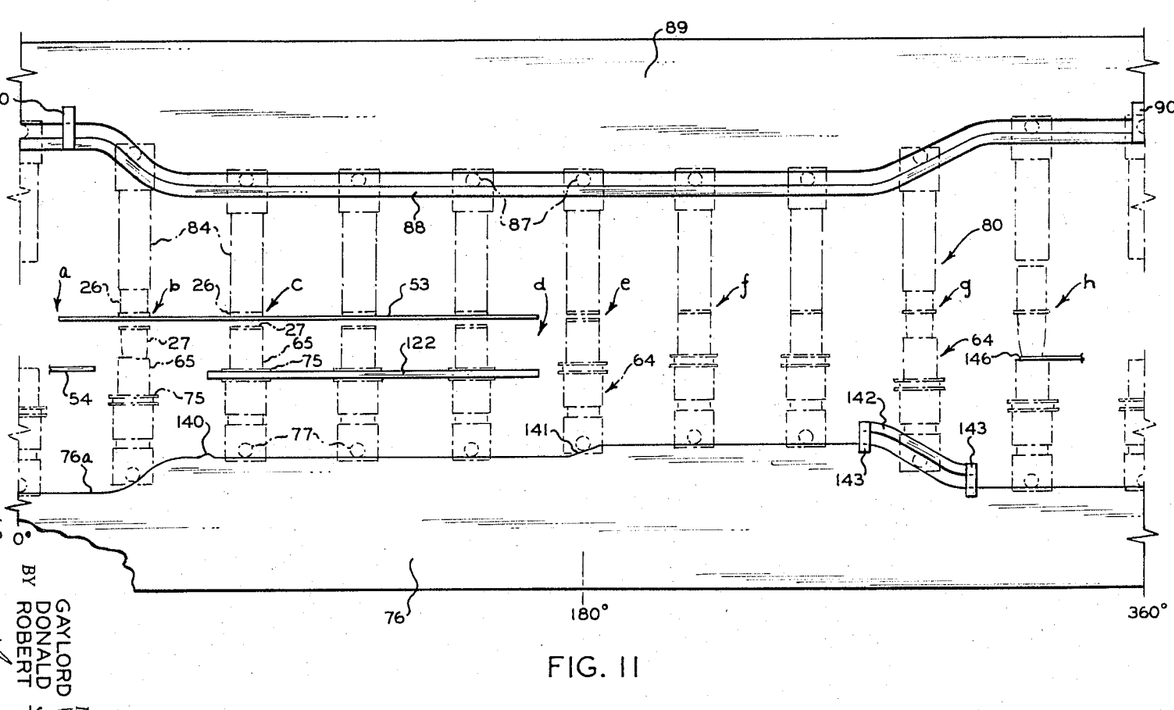
FIGURE 11 is an enlarged, side elevational view schematically indicating the development of the stationary, circular cam tracks for controlling the vertical movement of the container assembling guide tube assemblies.

FIGURE 11 illustrates the shape of the stationary circular cams 76 and 88–89. In FIGURE 11 the various lobes on the cam can be located relative to the shelf or floor 53, which begins at point *a* at the star wheel members 50 and extends, as shown in FIGURE 7, almost 180° from this point. The various diagrammatic representations show successive positions of the lower and upper guide tube assemblies 64 and 80, respectively, as they move clockwisely (FIGURE 7) from the point *a* through 360°. At position *b* the container section 27 has been received on the floor section 54 and is about to be delivered to the lower sleeve 65. Also, the container section 26 has been received on the shelf or floor 53 and the upper sleeve 84 is commencing to descend over the container section 26. At the point *c* the container section 27 is seated in the sleeve 65 and the container section 26 in the receiving sleeve 84. Just prior to the time the upper and lower guide tube assemblies reach position *c*, the lower guide tube assembly 64 has traveled over a rather sharp lobe 140 provided on cam surface 76a, which jars the container 27 sufficiently to align the ribs or flutes of the container section 27 with the corrugations 65a in the sleeve 65 and properly seats the section 27 if it is not already properly seated. Also, just prior to the time the assemblies 64 and 80 reach position *c*, the pulley 75 engages the belt 122 and as the upper and lower guide tube assemblies move continuously along, the sleeve 65 is brought to a predetermined speed of rotation. At point *d* the guide tube assemblies pass beyond the belt 122 but, of course, the lower sleeve assembly 64 continues to spin freely. It will be seen that a lobe 141 is provided on the cam surface 76a to raise the lower guide tube assembly 64 and fit the flange 27b of the container section 27 around the flange 26b of the container section 26. The spin welding operation takes place between positions *e* and *f*, with the extent of the relative rotation governed by the state of the interference fit between flanges 26b and 27b. At location *g* the lower and upper guide tube assemblies 64 and 80, respectively, are being lowered and raised, respectively, and at position *h* they are fully lowered and raised, respectively, so that the completed container C can be discharged to the leading end of conveyor belt 46. A cam roller retainer part 142 mounted to the cam 76 by bars 143 insures the downward travel of the lower guide tube assembly 64.

Finally, at the discharge end of the machine a stationary air jet pipe 144 (see FIGURES 6 and 7) mounted by a bracket 145 is employed to blow the completed container C from the discharge shelf 146 on which it is deposited by the lower pedestal post 62 to the conveyor 46, the air pipe 144 which is connected with a suitable source of air under pressure having a pair of openings 147 and 148 horizontally spaced to direct a stream of air at the sections 26 and 27, respectively.

From the conveyor 46 the completed containers moved on a conveyor 149 (see FIGURE 1) to a conventional inverting device which turns them end for end and travels them on a conveyor 151 to a labeling machine 152 which applies adhesive to a label and secures the label to the container section 26, as shown in FIGURE 2, at 153. Then completed containers pass on a conveyor 151a to a conventional filling machine 154 which fills them with a material such as detergent through the opening O in the top section 27. Thereafter the containers C proceed on a conveyor 155 to an adhesive applying machine 156 which applies adhesive to the tops of the containers C and from there, on a conveyor 157, to a machine 158 for applying the perforated caps 159 to the containers C as shown in FIGURE 2. Alternatively, the caps could be friction welded in place in a machine similar to that described. Finally, the containers move on a conveyor 160 to a stamp application machine 161 which applies a stamp 162 over the perforate openings 163 in caps 159, and the containers then move on conveyor section 164 to machines for packing them in cartons.

It will be plain that FIGURE 1 schematically depicts an assembly line in which the plastic material is fed to formers at one end and the completed containers leave the line at the opposite end. It is believed apparent that the disclosure teaches new and novel methods of forming containers and novel apparatus for forming the containers.

*The operation*

In operation the top forming machine forms the eventual top sections 27 of the containers and the bottom forming machine the eventual bottom sections 26 of the containers in the plastic webs 20 and 21, respectively. Webs 20 and 21 are then led through trimming and punching and trimming machines 28 and 29, respectively. In the trimming machine the die members 35 remove the container sections 26 from the web 20 and they are blown by air from nozzles 36 through rows of tubes 39 to the conveyor 40, with the lips 26a thereof disposed in engagement with the belt conveyor 40. In the punching and trimming machine 29 the container sections 27 have openings O punched in their end walls by punches 34a and they are removed from the web 21 by dies 35 and blown out tubes 37 by the intermittent jets of air issuing from air jet nozzles 36. Tubes 37 are so shaped that they invert the container sections 27 so that the end walls thereof, with the openings O therein, engage the surface of conveyor belt 38.

From the belts 38 and 40 the container sections 27 and 26 move to the accumulator tables 42 and 41 and thence in single file on conveyors 46 and 45 to the assembling machine 49. The sections 27 are transferred by star wheel portions 50 to the shelf 53, and the sections 26 are transferred from the conveyor 45 to the shelf 54 and thence to the sleeves 65 on the lower guide tube assemblies 64. After the container section 27 is settled in a sleeve 65 by the cam or lobe portion 140, the belt 122 rapidly brings the sleeve 65 to a predetermined speed of rotation and thence cam lobe 141 seats the lip sections 26b within the lip portions 27b. Because the bottom portions 26 are not substantially tapered, they do not lose their alignment when they are mounted in position above the top sections 27, as might occur if the tapering sections were disposed in the above position at the time of effecting juncture of the sections. Frictional heat is, of course, generated during the time the lip portion 27b is moving axially up around the lip section 26b and for a short time thereafter. The speed of rotation (which, for example, may be in the neighborhood of 2000 r.p.m.) is predetermined with relation to the mass of the rotating portion of the lower guide tube assemblies 64 so that a predetermined amount of energy will be absorbed by the material regardless of the character of the interference fit of sections 26b and 27b.

When a speed of 2600 r.p.m. is employed with a part 27 weighing about half an ounce and having an interior diameter at the lip 27b of about 2 13/16 inches, the combined mass of the rotating members 75, 65, 66, 72, 73, and upper race of bearing 68 of each assembly 64 may be, for example, 5½ pounds. The predetermined inertia energy potential with which each part 27 is loaded is then a function of the combined mass of all the rotating parts of each lower shell holder assembly 64 and the speed of rotation of the surface of the part to be welded. Once the rotative energy is imparted to the loaded part 27 and the drive of belt 122 is released, it is only necessary to maintain the first freely rotating part engaged with and in a state of rotation relative to the part 26 to frictionally heat and fuse the parts together to a state in which the part 27 no longer rotates relative to the part 26. As noted previously, regardless of the state of the fit, the same amount of energy is transmitted each time and the same liquid-tight weld or seal is always achieved. Because the pulleys 75 are disengaged from the belt 122 prior to the time any welding occurs, the parts are never forcibly rotated relatively to the extent that a weld once secured is ruptured and only a predetermined energy is supplied. Finally, air jets directed from openings 147 and 148 blow the completed container C to the conveyor 46, from which it proceeds to the inverter, labeler, filling machine, adhesive applying machine, cap applicator, and stamp applicator, as noted.

It should be apparent that we have perfected a container forming line of extreme practicality which makes proper allowances for the fact that the container sections 26 and 27 cannot be formed with absolute precision in mass production operations and which forms and assembles the container sections in a most expeditious manner.

It is to be understood that the drawings and descriptive matter are in all cases to be interpreted as merely illustrative of the principles of the invention, rather than as limiting the same in any way, since it is contemplated that various changes may be made in the various elements to achieve like results without departing from the spirit of the invention or the scope of the appended claims.

We claim:
1. A method of joining thermoplastic hollow sections in end-to-end relation comprising: applying a drive to bring one of the sections to a state of relative rotation with the other section; releasing said drive while permitting said one section to spin; and bringing said sections into end-to-end engaging relation while said sections have relative rotation to weld the sections together with the controlled frictional energy created by their engaging relation during relative rotation.

2. A method of joining thermoplastic hollow sections in end-to-end relation comprising: applying a drive to bring one of the sections to a predetermined speed of rotation relative to the other section; releasing said drive while permitting said one section to spin; and bringing said sections axially into snug overlapping relation to weld the lapped sections with a controlled frictional energy.

3. A method of forming thin-walled, thermoplastic containers comprising: differential pressure forming container upper sections in a web; differential pressure forming container lower sections in another web of a size such that said upper and lower sections would be received one by the other with an interference fit; separating said upper and lower sections from said webs and forming openings in the tops of said upper sections; joining together open ends of the sections formed by their separation from the webs; applying a drive to bring certain of the sections to a predetermined state of relative rotation with their mating sections; releasing said drive while permitting said certain sections to spin; and moving said certain sections and mating sections relatively axially while said certain sections are spinning to bring the end edges thereof into interference fitting, lapped engagement to generate a frictional heat which welds said sections together in a circular seam.

4. In apparatus for assembling snugly fitting, mating thermoplastic container parts; first conveyor means for moving said mating parts through a path of travel in end-to-end relation; means driving one of said mating parts during a portion of said path of travel only for bringing said one of said parts to a state of relative rotation with the other part; and means for moving said parts relatively axially into lapped end engagement during another portion of said path of travel, and while said one of said mating parts has relative rotation with the other mating part to generate frictional heat welding the parts together.

5. Apparatus for assembling upper and lower, mating thermoplastic container shells comprising; carrier means movable through a path of travel; lower guides thereon receiving certain of said container shells, said lower guides including relatively rotatable parts; upper guides on said carrier means, and vertically aligned with said lower guides, receiving mating conveyor shells and vertically aligning them with said certain shells; drive means engaged by said lower guides during a portion of said path of travel to bring said certain shells to a predetermined speed of rotation relative to their mating shells; and means for moving at least one of said upper and lower guides axially during another portion of said path of travel, and while said certain shells have relative rotation with their mating shells to move the edges of mating shells into engagement and generate frictional heat welding the edges together.

6. A method of joining thermoplastic parts comprising: rotating the parts relatively to impart a predetermined relative rotation energy thereto; releasing one of the parts to permit it to spin freely; and bringing said parts into engagement while said one part is spinning freely; said energy being such that it creates sufficient frictional heat to weld said parts together when they are brought into engagement but is less than that which would rupture the weld which is made.

7. Apparatus for joining thermoplastic parts comprising: means for holding one of said parts from rotating; means for revolving another part relative thereto at a speed to impart a predetermined relative energy thereto and then releasing the revolving part to spin freely; and means for moving said parts into engagement while said one part is spinning freely so that the relative rotation creates frictional heat which welds the parts together, the energy imparted being such that the relative rotation creates sufficient frictional heat to weld the parts together but is less than that which would rupture the weld which is made.

8. In container forming apparatus; means for receiving a first web with thermoplastic container bottom parts formed therein and severing said parts from said web; first conveyor means leading therefrom; means for removing said parts to said first conveyor means and disposing them in inverted position thereon; means for receiving a second web with thermoplastic container upper parts having a bell shaped edge formed therein, punching filling openings in the ends of said upper parts, and severing them from said web; second conveyor means leading therefrom; means for removing said upper parts to said second conveyor means and disposing them in inverted position; assembly means receiving said inverted bottom parts above said inverted upper parts and traveling them relatively axially into end-to-end lapped engagement; and means for friction welding said engaged parts together.

9. In apparatus for assembling snugly fitting thermoplastic container top and bottom parts; means for holding a container top part and a container bottom part in axially spaced apart edge to edge disposition; drive means for relatively rotating said holding means to bring one of the parts up to a predetermined state of relative rotation with the other; means for disengaging said drive means and said holding means to permit said holding means for said one of said parts to spin freely; and means for substantially immediately moving one of said parts in an axial direction relative to the other to bring said parts into engagement while said parts have relative rotation and generate a controlled frictional heat for welding the parts together in a circular seam.

10. In apparatus for assembling thermoplastic container top and bottom, mating shells in which the top shell edges receive the bottom shell edges but are of less internal diameter than the bottom shell edges; frame means; a rotary carrier mounted thereon and movable through an annular path of travel; means for revolving said carrier; lower vertical guide sleeve assemblies on said carrier mounted for vertical axial movement thereon; a stationary annular cam track on which said assemblies ride; each assembly including an upper sleeve for receiving one of said shells rotatably mounted on a lower sleeve; upper vertical guide sleeve assemblies for receiving mating shells mounted by said carrier for vertical axial travel in vertical alignment with said lower assemblies; a stationary annular cam track on which said upper assemblies ride; pulleys mounted on the upper sleeves of the lower guide assemblies to travel therewith on said carrier; and endless belt means supported by said frame means in the path of travel of said pulleys with said carrier through a portion of said path of travel so that said lower assemblies and the shells carried thereby are brought up to a predetermined speed of rotation as the lower assemblies are revolved and then are released when the pulleys travel beyond said belt means; one of the cam tracks being so configured that the upper and lower guide sleeve assemblies have relative axial movement to bring the edges of the top and bottom shells into interengaging relation after said lower assemblies pass beyond said endless belt means and the friction heat generated by said interengagement during relative rotation welds said shells together in a circular seam.

11. The combination defined in claim 10 in which the upper sleeves of said lower guide assemblies and the upper guide assemblies are fluted for receiving fluted container shells.

12. The combination defined in claim 11 in which said cam track for the lower guide sleeve assemblies has a sharp lobe joining said assemblies to seat the shells in the upper sleeves thereof prior to the time the pulleys engage said belt means.

13. The method of joining together first and second thermoplastic parts, that includes loading said first part with rotatable means to augment the mass of the part itself, imparting rotation to said loaded first part to create a rotative inertia energy potential, then substantially freeing the loaded first part for rotation by the energy so created, and maintaining said first freely rotating part engaged with and in a state of relative rotation with said second part to frictionally heat and fuse the parts together to a state of non-relative rotatability.

14. The method of claim 13 in which the total energy utilized for said heating and fusion is derived substantially entirely from said rotating energy potential of the loaded first part.

15. The method of claim 13 in which said second part is held against rotation during said heating and fusion.

16. The method of claim 13 in which said parts are frictionally interengaged only after creation of said first member energy potential.

17. The method of claim 13 in which said parts are hollow sections, the end of one being received within and in engagement with the end of the other section.

18. The method of claim 13 in which said first section is loaded by a predetermined mass which is brought to predetermined rotative speed to create predetermined rotative energy.

19. For joining together a succession of parts of first and second thermoplastic parts one of which has an annular surface receivable within a surrounding annular surface of the other part for engagement and fusion therewith but at varying degrees of tolerances between the surfaces of different pairs, the method that includes loading each first part with rotatable mass to augment the mass of the part itself, imparting rotation to the loaded first part to create a rotative inertia energy potential, then substantially freeing the loaded first part for rotation by the energy so created, maintaining the freely rotating part with its said surface engaged with and in a state of relative rotation with the said surface of the second part to frictionally heat and fuse the parts together, and limiting relative rotation of the parts variably as between different pairs in accordance with their initial surface tolerances in relation to a uniform application of said energy potential.

20. The method of claim 19 in which said parts are hollow container sections.

21. The method of claim 20 in which said second part is held against rotation during said heating and fusion and in which said surfaces are frictionally engaged only after creation of said first member energy potential.

22. The method of claim 21 in which said first sections are loaded by the same predetermined mass which is brought to the same predetermined speed to create the same predetermined potential rotative energy applicable to the successive container section pairs.

23. Apparatus for joining thermoplastic sections in end-to-end relation comprising: means for applying a drive to bring one of the sections to a state of relative rotation with the other section; means for releasing said drive to permit said one section to spin freely; and means for bringing said sections into end-to-end engaging relation after said drive is released and while said sections have relative rotation to weld the sections together with the frictional energy created by their engaging relation during relative rotation.

References Cited by the Examiner

UNITED STATES PATENTS

| | | | |
|---|---|---|---|
| 2,584,095 | 1/1952 | Slaughter | 156—69 X |
| 2,736,065 | 2/1956 | Wilcox | 156—293 |
| 2,853,118 | 9/1958 | Schnitzius | 156—582 |
| 2,966,833 | 1/1961 | Leibrich | 93—55.1 |
| 3,028,798 | 4/1962 | Allen | 93—55.5 |
| 3,069,039 | 12/1962 | Stickney | 215—1 |
| 3,078,912 | 2/1963 | Hitzelberger | 156—73 X |
| 3,100,576 | 8/1963 | Frank | 215—1 |
| 3,216,874 | 11/1965 | Brown | 156—69 |

EARL M. BERGERT, *Primary Examiner.*

P. DIER, B. STICKNEY, *Assistant Examiners.*